United States Patent
Lee et al.

(10) Patent No.: US 10,960,816 B2
(45) Date of Patent: Mar. 30, 2021

(54) VEHICLE ENGINE SOUND CONTROL SYSTEM AND CONTROL METHOD BASED ON DRIVER PROPENSITY USING ARTIFICIAL INTELLIGENCE

(71) Applicants: Hyundai Motor Company, Seoul (KR); Kia Motors Corporation, Seoul (KR)

(72) Inventors: Dong-Chul Lee, Gyeonggi-do (KR); In-Soo Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/688,590

(22) Filed: Nov. 19, 2019

(65) Prior Publication Data
US 2020/0324697 A1 Oct. 15, 2020

(30) Foreign Application Priority Data
Apr. 15, 2019 (KR) .................. 10-2019-0043753

(51) Int. Cl.
| | |
|---|---|
| *B60W 40/08* | (2012.01) |
| *G06N 3/08* | (2006.01) |
| *H04R 3/00* | (2006.01) |
| *B60Q 5/00* | (2006.01) |

(52) U.S. Cl.
CPC .............. *B60Q 5/008* (2013.01); *B60W 40/08* (2013.01); *G06N 3/08* (2013.01); *H04R 3/00* (2013.01); *B60W 2540/043* (2020.02); *H04R 2499/13* (2013.01)

(58) Field of Classification Search
CPC ........ G06N 3/08; H04R 3/00; H04R 2499/13; B60Q 5/008; B60W 40/08; B60W 2540/043
See application file for complete search history.

(56) References Cited

U.S. PATENT DOCUMENTS

| | | | |
|---|---|---|---|
| 9,911,405 B2 | 3/2018 | Lee et al. | |
| 2012/0041646 A1* | 2/2012 | Ulbrich | B60R 21/0136 701/45 |
| 2018/0118219 A1* | 5/2018 | Hiei | B60W 50/14 |
| 2018/0288182 A1* | 10/2018 | Tong | G06F 16/24568 |
| 2019/0111839 A1* | 4/2019 | Lee | B60Q 5/005 |
| 2020/0013225 A1* | 1/2020 | Park | B60Q 9/008 |

FOREIGN PATENT DOCUMENTS

| | | | |
|---|---|---|---|
| CN | 104276180 | * | 1/2014 |
| CN | 109249844 | * | 1/2019 |
| KR | 10-1876022 B1 | | 2/2018 |

* cited by examiner

*Primary Examiner* — Regina N Holder
(74) *Attorney, Agent, or Firm* — Mintz Levin Cohn Ferris Glovsky and Popeo, P.C.; Peter F. Corless

(57) ABSTRACT

A vehicle engine sound control system identifies a vehicle driver by a driver smartphone or a driver biometric information detecting sensor and analyzes the music to which the identified driver listens with the driver smartphone or a vehicle infotainment system. A traveling pattern of the driver is analyze by applying any one among a vehicle, a GPS, a road, and weather as a condition. A driver propensity engine sound pattern is generated as a result value by learning at least any one information among a driver identifying unit, a music analyzing unit, and a travel analyzing unit. The engine sound is adjusted and output based the result value.

20 Claims, 9 Drawing Sheets

VEHICLE ENGINE SOUND CONTROL SYSTEM AND CONTROL METHOD BASED ON DRIVER PROPENSITY USING ARTIFICIAL INTELLIGENCE

CROSS-REFERENCE TO RELATED APPLICATION

This application claims priority to Korean Patent Application No. 10-2019-0043753, filed on Apr. 15, 2019, which is incorporated herein by reference in its entirety.

BACKGROUND

Field of the Disclosure

The present disclosure relates to a vehicle engine sound control system and control method based on driver propensity using artificial intelligence, and more particularly, to a vehicle engine sound control system and control method based on driver propensity using artificial intelligence for customized engine sound control based the musical taste and mood state of a driver.

Description of Related Art

Today, a vehicle is in a downsizing trend in response to stringent environmental regulations. Therefore, the number of cylinders or the displacement volume of an engine is also being downsized. Meanwhile, the downsizing of the engine may be beneficial in terms of environment, but less beneficial in terms of engine sound. In recent years, vehicle consumers tend to emphasize driving sensibility. Therefore, it is a trend to provide a driving selector switch for each of various vehicle makers.

For example, an eco-mode is provided that emphasizes fuel economy and a sports mode or a dynamic mode is provided for speed or punchy driving. A driver may select a sport mode or a dynamic mode to enjoy dynamic traveling. Nevertheless, the sound of the downsized engine sound may be disappointing. In addition, if the engine sound is heard the same even if the driving mode is changed, the driver may be less satisfied.

Accordingly, functions for outputting virtual engine sound have recently been developed. For example, the engine sound stored in a main board is output through an indoor speaker. The intensity of the sound pressure to be output is adjusted based on the degree of engagement of an accelerator pedal by the driver.

However, as described above, the simple adjustment of the sound pressure in proportion to the opening amount of the pedal does not improve the enjoyment of driving since the driver recognizes the sound as artificial engine sound. In addition, in the related art, noise has been eliminated or decreased by providing a sound wave having the wavelength opposite to the engine noise. This is also referred to as active noise cancelling technology.

However, if the engine sound is canceled using the active noise cancelling technique as described above, the dynamic driving sensibility is unable to be felt. In addition, the above-described conventional techniques have been applied uniformly regardless of the driver. In other words, only the predetermined virtual engine sounds for the traveling mode selected by the driver are heard except for the current emotional state of the driver. Therefore, there has been a limitation in that the related art is unable to provide the engine sound that corresponds to the current emotional state of the driver currently within the vehicle.

The contents described in this section are merely to help the understanding of the background of the present disclosure, and may include what is not previously known to those skilled in the art to which the present disclosure pertains.

SUMMARY

In order to overcome the above problems, an object of the present disclosure is to provide a vehicle engine sound control system and control method based on driver propensity using artificial intelligence, which may automatically adjust engine sound that corresponds to the current emotional state of a driver currently boarding a vehicle.

The present disclosure provides a vehicle engine sound control system based on driver propensity using artificial intelligence that may include a driver identifying unit configured to detect a vehicle driver by a driver smartphone or a driver biometric information detecting sensor; a music analyzing unit configured to analyze the music to which the detected driver listens with the driver smartphone or a vehicle infotainment system; a travel analyzing unit configured to analyze a traveling pattern of the driver by applying any one among a vehicle, a global positioning system (GPS), a road, and weather as a condition; an artificial intelligence learning unit configured to generate a driver propensity engine sound pattern as a result value by learning at least any one information among the driver identifying unit, the music analyzing unit, and the travel analyzing unit; an engine sound controller for controlling the engine sound of the vehicle based on the result value of the artificial intelligence learning unit; and an output unit configured to output the adjusted engine sound.

In addition, the driver identifying unit interlocks with a near-field wireless communication, and may be configured to confirm driver identification (ID) information with the driver smartphone, and confirm a driver biometric recognition information with the driver biometric information detecting sensor, and the driver biometric information detecting sensor may be a driver wearable device installed within a vehicle to detect the driver biometric information with a direct measurement signal or connected with a vehicle infotainment system to detect the information with an indirect measurement signal. The music analyzing unit may be configured to reflect the characteristics of the type of music or Bits of music to which the driver listens while the vehicle is being driven.

The travel analyzing unit may further include at least any one of the traveling regional information or the traveling temporal information of the vehicle, and the artificial intelligence learning unit may be configured to learn any one or more among the age, gender, and the genre and Bits information of favorite music of the driver. In addition, the engine sound controller may be configured to output a primary engine sound based on the result learned in the artificial intelligence learning unit, and implement a target engine sound desired by the driver by re-learning a feedback result value at which the driver has responded to the output primary engine sound in the artificial intelligence learning unit.

The artificial intelligence learning unit is a guidance learning method using recurrent neural network (RNN) and deep neural network (DNN) methods. In addition, the feedback result value reflects at least any one changed value of the music analyzing unit and the travel analyzing unit. The engine sound controller may be configured to adjust the arrangement and level of an engine order of the vehicle. The engine sound may be any one among Powerful sound, Pleasant sound, Dynamic sound, and Sporty sound. In addition, the engine sound controller may be configured to adjust frequency weight information of the engine sound, and adjust equalizer (EQ) information of the engine sound. The output unit may be at least any one among an indoor speaker of the vehicle, a resonator, and a frequency filter.

According to another aspect, the present disclosure provides a vehicle engine sound control method based on driver propensity using artificial intelligence that may include outputting primary engine sound of a vehicle by learning first driving-related information regarding artificial intelligence learning information of a driver in the artificial intelligence of the vehicle; and outputting favorite target engine sound of the driver by additionally learning second driving-related information generated by the artificial intelligence learning information by the driver's response to the output primary engine sound.

The first driving-related information may be driver ID information confirmed by a driver smartphone in interlock with near-field wireless communication or driver biometric recognition information confirmed by a driver biometric information detecting sensor. In addition, the first driving-related information may be at least any one of the sound source information stored in the driver smartphone, and the characteristics information of the type of music or Bits of music to which the driver listens while the vehicle is being driven. The first driving-related information may include at least any one among an acceleration pattern, a shift pattern, a brake pattern, and a fastest use pattern Further, the first driving-related information may include at least any one of the traveling regional information or the traveling temporal information of the vehicle. The artificial intelligence may use a guidance learning method using RNN and DNN methods. In addition, the second driving-related information may be frequency weight information of the engine sound or equalizer EQ information of the engine sound. The target engine sound may be adjusted by at least any one among a vibration-based engine sound control (ESEV), a virtual sound source control (ASD), and structure-borne noise control (ESG). The target engine sound may be output through at least any one among an indoor speaker of the vehicle, a resonator, and a frequency filter.

According to the present disclosure as described above, the following effects can be obtained.

Firstly, it may be classified into various types by reflecting the traveling style analysis of the vehicle, the types of music to be listened to while driving, and furthermore, the characteristics of the Bits of music, and thus, it may be possible to perform the additional control based the characteristics of the driver in the engine sound control algorithm such as the engine vibration-based engine sound control technology or the virtual sound source control technology, thereby automatically providing the individual engine sound that satisfies the sensibility of the driver.

Secondly, it may be possible to automatically detect the driver within the vehicle and perform the engine sound control by the artificial intelligence using the musical taste information of the corresponding driver, thereby maximizing the enjoyment of driving since the engine sound is output without operation of the driver.

Thirdly, it may be possible to perform the feedback control for the driving propensity or the musical propensity of the driver in real time, thereby providing the engine sound optimized for the current emotional state of the driver to maximize the driver satisfaction.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
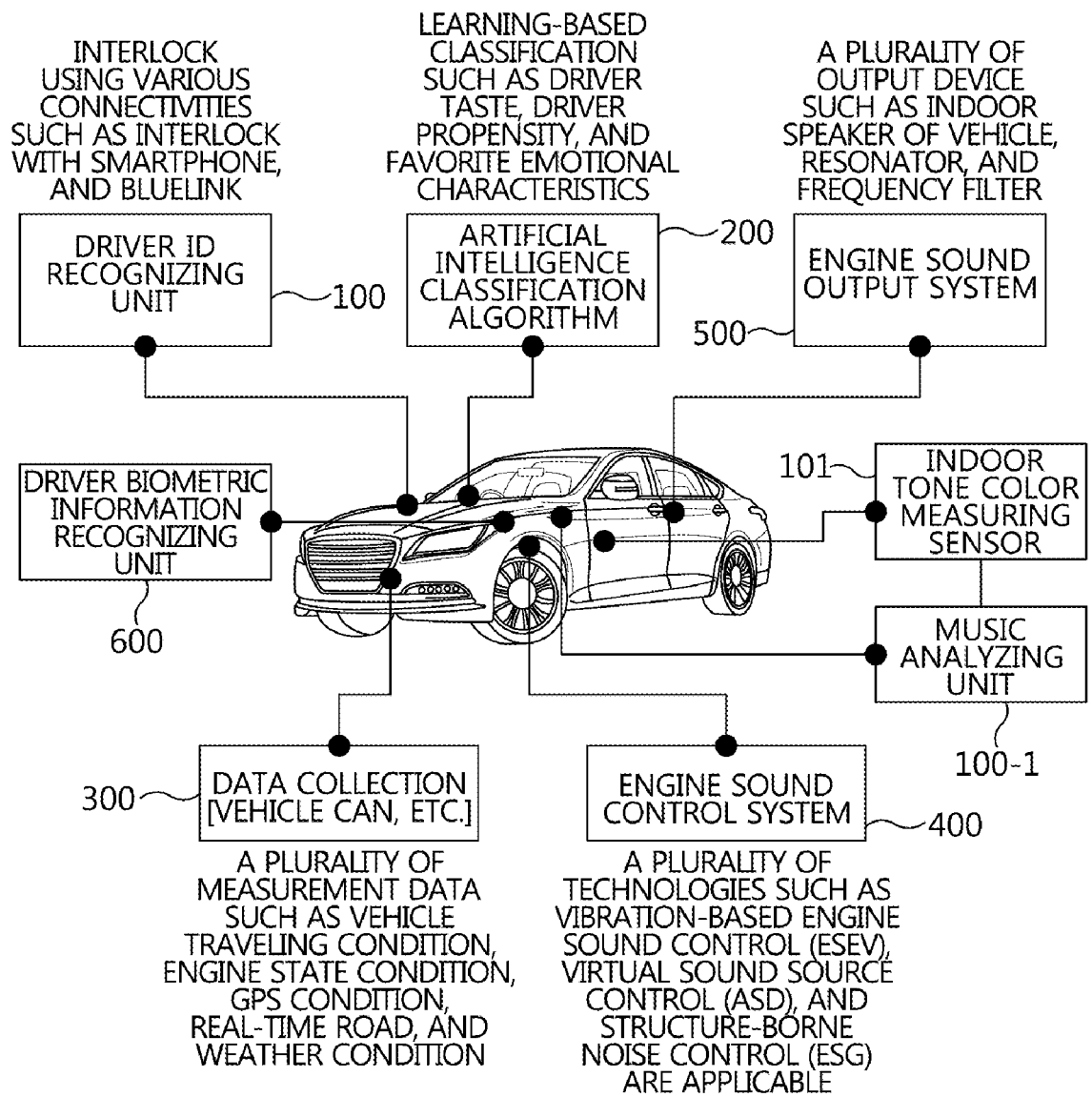
FIG. 1 is a diagram showing an overall configuration of a system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various modifications and various forms may be made in the present disclosure, so that specific exemplary embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate various components, but the components should not be limited by the terms. The terms are used to differentiate one element from another. For example, a first component can be referred to as a second component, and similarly, the second component may be also referred to as the first component without departing from the scope of the present disclosure.

Unless otherwise defined, all terms including technical and scientific terms used herein have the same meaning as commonly understood by one of normal skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

A vehicle engine sound control system based on driver propensity using artificial intelligence according to an exemplary embodiment of the present disclosure will be described with reference to the accompanying drawings. FIG. 1 is a diagram showing an overall configuration of a system according to an exemplary embodiment of the present disclosure. A vehicle engine sound control system based on driver propensity using artificial intelligence may include a driver identifying unit 100, a music analyzing unit 100-1, an artificial intelligence learning unit 200, a travel analyzing unit 300, an engine sound controller 400, an output unit 500, and a driver biometric information recognizing device 600. The various components of the system may be operated by a vehicle controller or other overall controller within the vehicle specifically programmed to execute the functions of each of the units.

Particularly, the driver identifying unit 100 may be configured to detect the vehicle driver. In addition, the driver identifying unit 100 may be configured to analyze the musical propensity of a driver by analyzing the music information of the smartphone held by the driver using the music analyzing unit 100-1 or analyze the musical propensity of the driver by detecting the driver biometric information using the driver biometric information recognizing device 600. The music analyzing unit 100-1 may be configured to analyze the music information that the driver enjoyed in the past and also the music that the driver is currently listening to in real time, and the analysis items may include the genre, Bits, and musician information, etc. of the music.

The music analyzing unit 100-1 may be connected with the driver identifying unit 100 to analyze the musical taste of the driver regardless of whether the driver is detected. For this purpose, the music analyzing unit 100-1 may be connected to an indoor tone color measuring sensor 101. The indoor tone color measuring sensor 101 may be configured to detect the music information reproduced in the indoor by frequency to provide it to the music analyzing unit 100-1.

For example, when the driver is detected in the driver identifying unit 100, the music analyzing unit 100-1 may be configured to analyze the musical taste using the music information heard in the vehicle during the past traveling confirmed through the identified existing information of the driver (e.g., music list or play list stored in the driver smartphone, or a vehicle infotainment system (see FIG. 4) interlocked with the driver biometric information recognizing device 600) or the music information generated in the vehicle infotainment system (see FIG. 4) interlocked with the driver biometric information recognizing device 600. On the other hand, the music analyzing unit 100-1 may be configured to analyze the musical taste of the driver by analyzing the music information heard by the driver using the vehicle infotainment system (see FIG. 4) interlocked with the driver biometric information recognizing device 600 during the current traveling of the vehicle even when the driver is not detected in the driver identifying unit 100.

The artificial intelligence learning unit 200 may be configured to learn at least any one information of the driver identifying unit 100, the music analyzing unit 100-1, the travel analyzing unit 300, and the driver biometric information recognizing device 600. For example, the artificial intelligence learning unit 200 may be configured to learn the taste, traveling propensity, or favorite emotional characteristic, etc. of the driver based on any one or more learning information of the driver identifying unit 100, the music analyzing unit 100-1, and the travel analyzing unit 300. In addition, the artificial intelligence learning unit 200 may be configured to learn the taste, traveling propensity, or favorite emotional characteristic, etc. of the driver based on the driver biometric information of the driver biometric information recognizing device 600 together with any one or more learning information of the driver identifying unit 100, the music analyzing unit 100-1, and the travel analyzing unit 300. Therefore, the artificial intelligence learning unit 200 may be configured to generate a driver propensity engine sound pattern as a result value.

The travel analyzing unit 300 may be configured to analyze the traveling pattern of the driver by applying any one of a vehicle, a Global Positioning System (GPS), a road, and weather. In particular, the travel analyzing unit 300 may be configured to analyze the traveling condition of the vehicle, the engine state condition, the GPS condition, the real-time road condition, and the weather environment condition, etc. The engine sound controller 400 may be configured to adjust the engine sound of the vehicle based on the driver propensity engine sound pattern that is the result value of the artificial intelligence learning unit 200.

In particular, the engine sound controller 400 may be configured to perform vibration-based engine sound control (ESEV) (see FIGS. 6 to 9), which is a preferred embodiment of the present disclosure. Furthermore, the engine sound controller 400 may be configured to perform a virtual sound source control (ASD) or a structure-borne noise control (ESG), etc. according to another exemplary embodiment of the present disclosure. The output unit 500 may be configured to output the adjusted engine sound. The output unit 500 may be configured to output the sound via a vehicle indoor speaker, a resonator, or a frequency filter.

Figure 2:
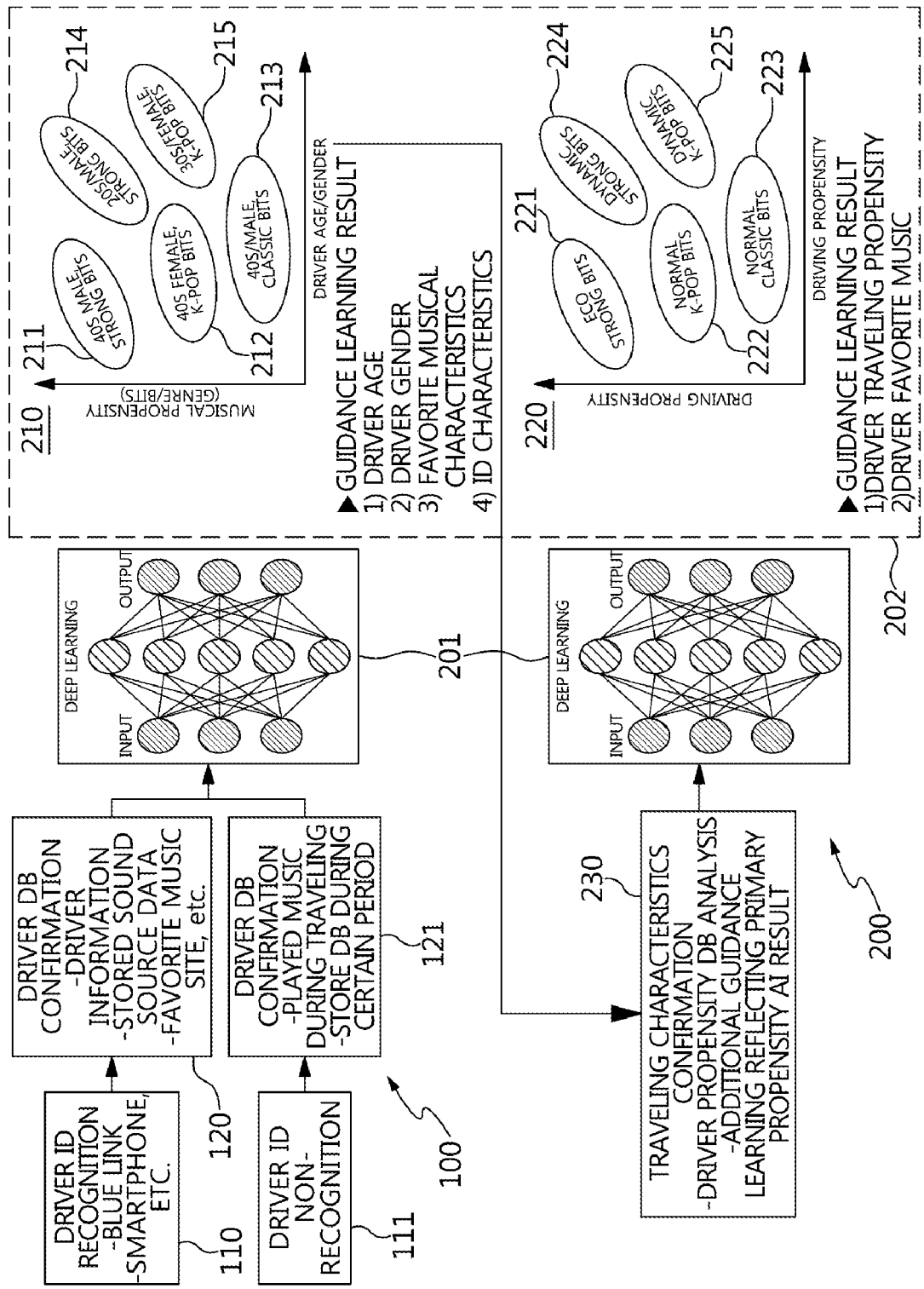
FIG. 2 is a diagram showing a procedure of an artificial intelligence learning unit according to an exemplary embodiment of the present disclosure to confirm the traveling propensity of the driver.

FIG. 2 is a diagram showing a procedure in which the artificial intelligence learning unit 200 according to an exemplary embodiment of the present disclosure confirms the traveling propensity of the driver in association with the driver identifying unit 100. The methods described herein may be executed by the overall controller discussed above. For example, the driver identifying unit 100 may include a driver ID identifying unit 110, an identification driver information unit 120, and unidentified driver information 121.

The artificial intelligence learning unit 200 may include an artificial intelligence module 201, a category module 202, and a driver traveling characteristic feedback module 230. In particular, the category module 202 may be classified into a first graph 210 and a second graph 220. The first graph 210 may be an initial generation result in which the artificial intelligence module 201 has used data, and the second graph 220 may be a learning generation result in which the artificial intelligence module 201 has re-learned and processed based on the driver reaction, etc. to the first graph 210 through the feedback control 230 (see FIG. 4). Therefore, the first graph 210 and the second graph 220 have been the same component but classified for explanation.

Therefore, a procedure of confirming the traveling propensity of the driver is as follows. The driver identifying unit 100 may be configured to detect the vehicle driver by confirming the driver ID with the driver belongings (e.g., items within the vehicle). More specifically, the driver identifying unit 100 may use Bluetooth or Blue Link of the driver smartphone, which is a type of driver belonging connected with the vehicle, to confirm the driver ID.

In addition, the driver identifying unit 100 may use the biometric information to confirm the driver ID. The driver biometric information may be mounted on the cluster instrument panel of the vehicle, and a pupil recognizing device of a window biometric sensor 603 (see FIG. 4) constituting the driver biometric information recognizing device 600 may be used, or a fingerprint recognizing device or a voice recognizing device, etc. may be used.

Furthermore, the driver identifying unit 100 may be configured to connect with the driver biometric information via Bluetooth or Blue Link in connection with any one of a steering wheel biometric sensor 601, a window biometric sensor 603, and a wearable biometric sensor 607 of the driver biometric information recognizing device 600. When detecting the driver ID, the driver identifying unit 100 may be configured to confirm the driver database (DB) such as the driver information, the stored sound source data, or the favorite music site by the driver information acquired from the identified driver of the identification driver information unit 120 acquired from the identified driver ID.

Herein, the driver information may be a taste, traveling propensity, and favorite emotional characteristics of the driver that have been previously learned, which is similar to the ID characteristic described below. Conversely, when not detecting the driver ID, the driver identifying unit 100 may be configured to confirm the music DB of the driver using the music hearing while the vehicle is being driven, the music becoming a DB and stored for a particular period of time, etc. by the driver information acquired from the unidentified driver of the unidentified driver information 121.

In other words, the detection of the driver ID by the driver ID identifying unit 110 may include, for example, a state in which the driver has entered the vehicle with the smartphone, and at this time, the driver DB may be confirmed using the Bluetooth information, etc. interlocked between the vehicle and the smartphone. Conversely, a failure of detecting or identifying the driver ID by the driver ID identifying unit 110 may include, for example, a state where the driver has entered the vehicle without holding a mobile device such as a smartphone capable of communicating with the vehicle, or a new driver who is entering the vehicle for a first time.

Therefore, when having failed to detect or identify the driver ID by the driver ID identifying unit 110, the driver identifying unit 100 may be configured to confirm the musical taste of the driver from the music to which the driver has listened to through the infotainment system while operating the vehicle. The artificial intelligence learning unit 200 may be configured to perform artificial intelligence learning using the driver musical taste information acquired from the driver information of the identification driver information 120 acquired from the driver ID recognized in the artificial intelligence module 201 or the driver information of the unidentified driver information 121 acquired from the driver unrecognized therein.

The artificial intelligence module 201 of the artificial intelligence learning unit 200 may be operated in interlock or connection with the music analyzing unit 100-1. Accordingly, the music analyzing unit 100-1 may reflect the characteristics of the type of music or the Bits of music to which the driver listens while the vehicle is being driven or operated. In addition, the artificial intelligence module 201 of the artificial intelligence learning unit 200 may be configured to learn any one or more of the age and gender of the driver, and the genre and Bits information of favorite music. This is described through the first graph 210 and the second graph 220 of the category module 202.

The first graph 210 shows the distribution of favorite music genre or Bits based on the age/gender of the driver according to the result of learning from the artificial intelligence module 201 of the artificial intelligence learning unit 200. A first category 211, which has been primarily learned, may include the driver age in the 40s, the gender being male, and the favorite music being strong Bits music. A second category 212, which has been primarily learned, may include the driver age in the 40s, the gender being female, and the favorite music being the music of K-POP Bits. A third category 213, which has been primarily learned, may include the driver age in the 40s, the gender being male, and the genre of the favorite music being the classical music. A fourth category 214, which has been primarily learned, may include the driver age in the 20s, the gender being male, and the favorite music being strong Bits music. A fifth category 215, which has been primarily learned, may include the driver age in the 30s, the gender being female, and the favorite music being the music of K-POP Bits. However, the present disclosure is not limited thereto.

As described above, in the first graph 210, the artificial intelligence learning unit 200 may be configured to obtain the characteristics of the age, gender, and favorite music, the ID characteristics, etc. of the driver as a result of the guidance learning to obtain driver traveling characteristic information 123 as a result. The artificial intelligence learning unit 200 may be configured to receive the driver traveling characteristic information into the driver traveling characteristic feedback module 230 to perform the additional guidance learning by the artificial intelligence module 201 of the artificial intelligence learning unit 200 again.

The additional guidance learning may include learning additionally reflecting the musical taste of the driver that changes in real time to the driver propensity according to the primarily learned category. For example, when a 20s male driver mainly listens to strong Bits music and recently, mainly listens to a weak Bits ballade, this may be learned with artificial intelligence in the additional guidance learning to be stored as a corresponding driver DB.

The second graph 220 shows the distribution of the traveling propensity and the favorite music of the driver through the additional guidance learning. The first category 221, which has been additionally learned, shows the traveling propensity of the driver as mainly driving in the ECO mode and the listening type of music being strong Bits music, as the information acquired by performing the additional guidance learning for the first category 211, which has been primarily learned.

The second category 222, which has been additionally learned, shows the traveling propensity of the driver as mainly driving in the NORMAL mode and the listening type of music being the music of K-POP Bits, as the information acquired by performing the additional guidance learning for the second category 212, which has been primarily learned. The third category 223, which has been additionally learned, shows the traveling propensity of the driver as mainly driving in the NORMAL mode and the listening type of music being the classical music, as the information acquired by performing the additional guidance learning for the third category 213, which has been primarily learned.

The fourth category 224, which has been additionally learned, shows the traveling propensity of the driver as mainly driving in the DYNAMIC mode and the listening type of music being strong Bits music, as the information acquired by performing the additional guidance learning for the fourth category 214, which has been primarily learned. The fifth category 225, which has been additionally learned, shows the traveling propensity of the driver as mainly driving in the DYNAMIC mode and the listening type of music being the music of K-POP Bits, as the information acquired by performing the additional guidance learning for the fifth category 215, which has been primarily learned. However, the present disclosure is not limited thereto. The engine sound controller 400 may be configured to output the engine sound through the output unit 500 using the traveling propensity and the favorite music information of the driver obtained from the artificial intelligence module 201 of the artificial intelligence learning unit 200.

Figure 3:
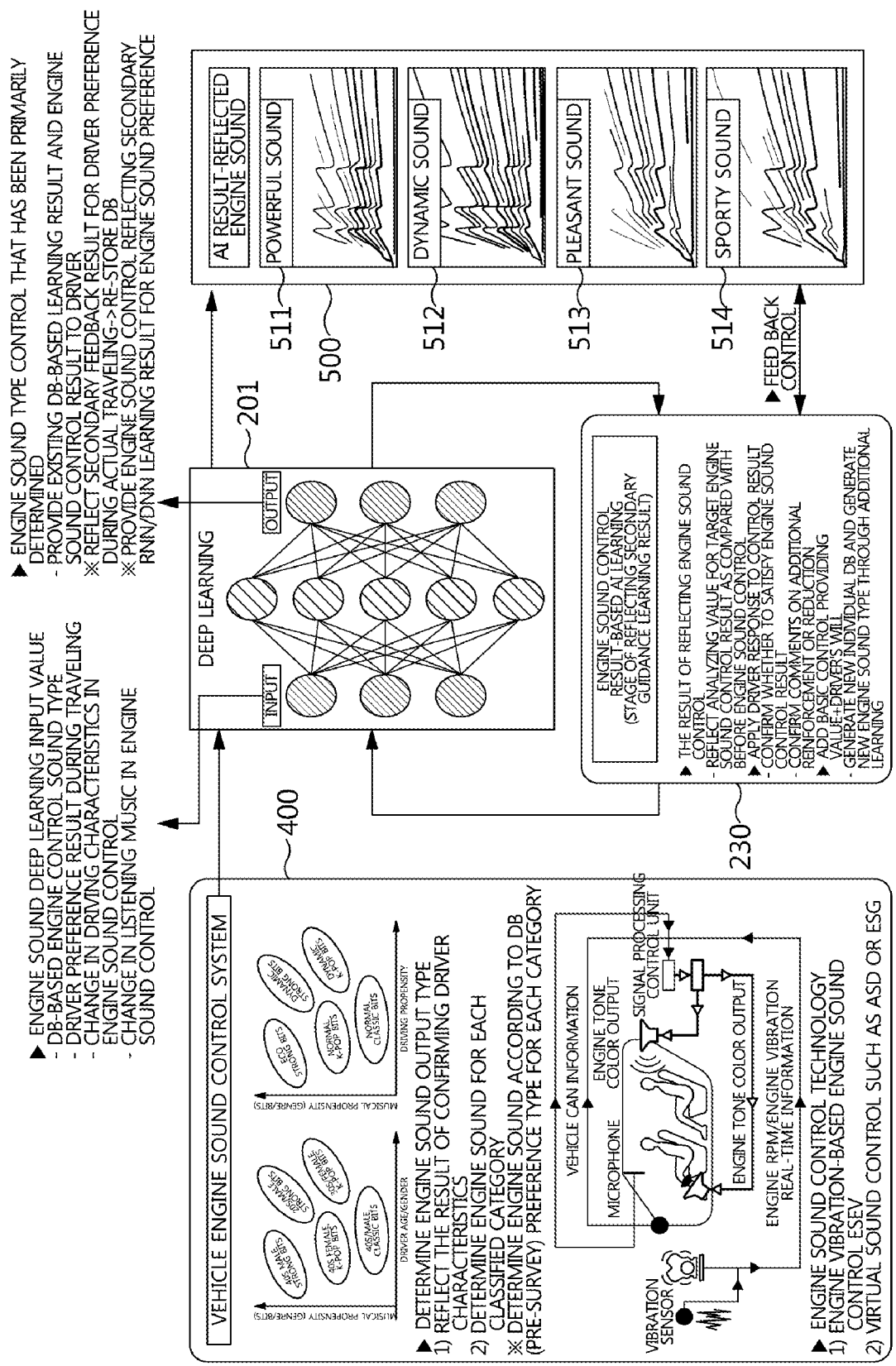
FIG. 3 is a diagram showing a feedback procedure according to an exemplary embodiment of the present disclosure.

FIG. 3 is a diagram showing a feedback procedure according to an exemplary embodiment of the present disclosure. In particular, the engine sound may be adjusted through a control of the arrangement and level of the engine order of the vehicle. In addition, the engine sound controller 400 may be configured to adjust the equalizer EQ of the engine sound. Then, the engine sound may be any one among Powerful sound 511, Dynamic sound 512, Pleasant sound 513, and Sporty sound 514. Furthermore, the engine sound may include luxury sound. In this case, the Powerful sound is a strong sense of mid/low frequency characteristics, the Dynamic sound is a strong sense of speed along with mid/low frequency characteristics, the Pleasant sound is a strong sense of pure sound without discomfort characteristics, the Sporty sound is a strong sense of speed along with pure sound characteristics, and the Luxury sound is a strong sense of high-quality sound characteristics which is quiet and harmonizes with pure sound.

Therefore, the engine sound controller 400 may use the traveling propensity and the favorite music information of the driver obtained from the artificial intelligence module 201 of the artificial intelligence learning unit 200. When the traveling propensity of the driver is mainly DYNAMIC mode, the engine sound controller 400 may be configured to output any one of the Powerful sound 511, the Dynamic sound 512, and the Sporty sound 514 with reference to the information of the travel analyzing unit 300 through the output unit 500. When the traveling propensity of the driver is mainly the NORMAL mode or the ECO mode, the engine sound controller 400 may be configured to output the Pleasant sound 513 or the Luxury sound with reference to the information of the travel analyzing unit 300 through the output unit 500. Meanwhile, the output unit 500 may be at least any one of an indoor speaker of the vehicle, a resonator, and a frequency filter.

Hereinafter, the engine sound satisfied by the driver will be referred to as target engine sound. The driver may also feel that the engine sound output according to mood is not satisfactory unlike usual. This part may be solved through the feedback procedure. In other words, the feedback procedure may include the feedback control 230 as a procedure for obtaining the target engine sound satisfied by the driver. The driver may change the type of music, change the volume, or operate the travel analyzing unit 300 in response to the engine sound heard through the output unit 500, which is referred to as a feedback control.

The artificial intelligence learning unit 200 may be configured to receive the feedback control information into the driver traveling characteristic feedback module 230 to perform secondary guidance learning, thereby implementing the target engine sound. In addition, the feedback control information may reflect the changed value of at least any one of the music analyzing unit 100-1 and the travel analyzing unit 300. In other words, the engine sound controller 400 may be configured to implement the target engine sound desired by the driver by outputting the primary engine sound based on the result learned by the artificial intelligence module 201 of the artificial intelligence learning unit 200, and re-learning the feedback control information in response to the primary engine sound output by the driver in the artificial intelligence learning unit.

At this time, the artificial intelligence module 201 of the artificial intelligence learning unit 200 may be a guidance learning method using RNN and DNN methods. In other words, the artificial intelligence module 201 of the artificial intelligence learning unit 200 according to a preferred embodiment of the present disclosure is a Deep Learning method for applying the guidance learning, and it is preferable that the RNN method capable of classifying complex input variables and the DNN method for final characteristics extraction applying the accumulated DB data are applied simultaneously.

For example, it may be assumed that the artificial intelligence module 201 of the artificial intelligence learning unit 200 confirms that the propensity and the musical propensity of a driver A are the fourth category 224, which has been additionally learned, and the engine sound of the Powerful sound 511 has been output through the output unit 500. When the driver A feels that the engine sound of the Powerful sound 511 heard during traveling is not satisfactory and changes the type of music to the classic, the secondary guidance learning may be performed by the artificial intelligence learning unit 200, and the vehicle may output the engine sound of the Pleasant sound 513 to the driver.

Meanwhile, it should be noted herein that the four types of engine sounds of the Powerful sound 511 to the Sporty sound 514 are provided as an example and not limited thereto. In addition, when the genre of the music completely changes from K-POP to the classic as in the case of the driver A, the type of engine sound may be also changed and provided. However, when the K-POP type is changed to a slow tempo song with a slightly slow Bits (e.g., from K-POP with strong Bits to ballade with week Bits), the engine sound of the Powerful sound 511 may also be provided, which has become softer, by adjusting the equalizer EQ of the engine sound of the Powerful sound 511 without changing the type of the engine sound.

Figure 4:
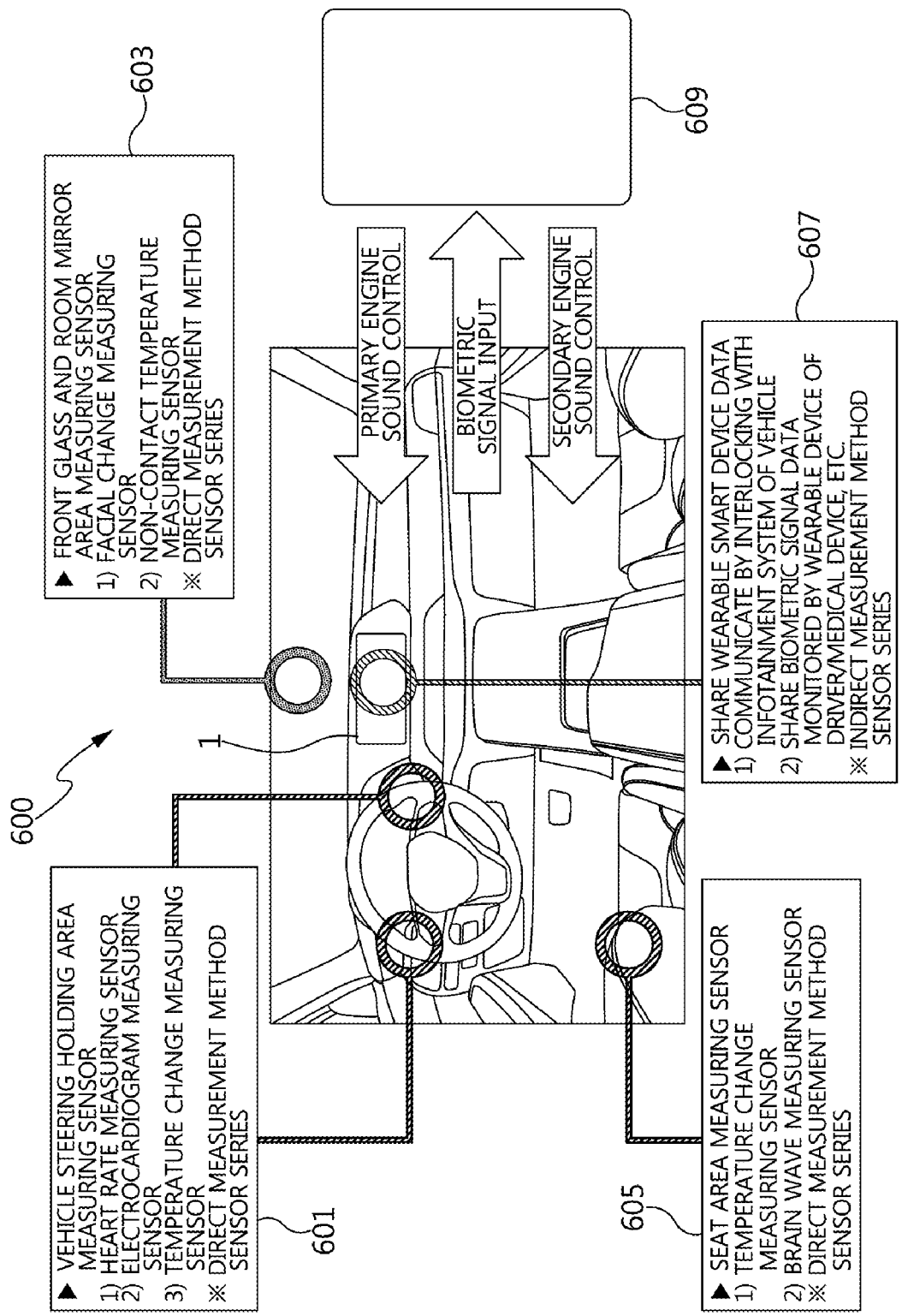
FIG. 4 is a diagram showing a configuration example of a driver biometric information recognizing device according to an exemplary embodiment of the present disclosure.

Meanwhile, FIG. 4 is a diagram showing a configuration example of a driver biometric information recognizing device 600 according to an exemplary embodiment of the present disclosure. As shown, a vehicle driver seat system 1 is provided as a place for installing and mounting the driver biometric information recognizing device 600. Specifically, the vehicle driver seat system 1 may include a steering wheel, a front window frame, a room mirror frame, a cluster, a dashboard, and a driver seat, etc.

The driver biometric information recognizing device 600 may use a direct measurement signal and an indirect measurement signal generated by a driver biometric information detecting sensor as a biometric signal, and may be configured to perform a near-field wireless communication such as Bluetooth or Blue Link. For example, the direct measurement signal may be a heart rate signal, an electrocardiogram signal, a facial pattern change, and a body temperature change signal, and for this purpose, the driver biometric information detecting sensor may use a steering wheel biometric sensor 601, a window biometric sensor 603, and a seat biometric sensor 605, installed within the vehicle to detect the driver biometric information as the direct measurement signal. The steering wheel biometric sensor 601 may be installed on the steering wheel to detect a change in the heart rate/electrocardiogram/hand temperature of the driver as a signal, the window biometric sensor 603 may be installed on a front window frame and a room mirror frame steering wheel to detect a change in facial surface/facial temperature of the driver as a signal, and the seat biometric sensor 605 may be installed on the driver seat to detect a change in body temperature/brain wave of the driver as a signal.

For example, the indirect measurement signal may be a driver biometric signal, and for this purpose, the driver biometric information detecting sensor may use a wearable biometric sensor 607. The wearable biometric sensor 607 may be a wearable smart device or a vehicle infotainment system configured to detect a biometric signal generated using a smart watch, a band, or a medical monitoring device worn by the driver as a driver wearable device. In addition, the driver biometric information recognizing device 600 may include a biometric information analyzing map 609, and the biometric information analyzing map 609 may be used to determine the suitability for the vehicle engine sound control result based on the musical propensity of the driver implemented by the artificial intelligence learning unit 200. For example, the biometric information analyzing map 609 involves the collected Big data for the change in the biometric signal in parameters, characteristic correlation, target engine sound control signal compensation, etc.

Figure 5:
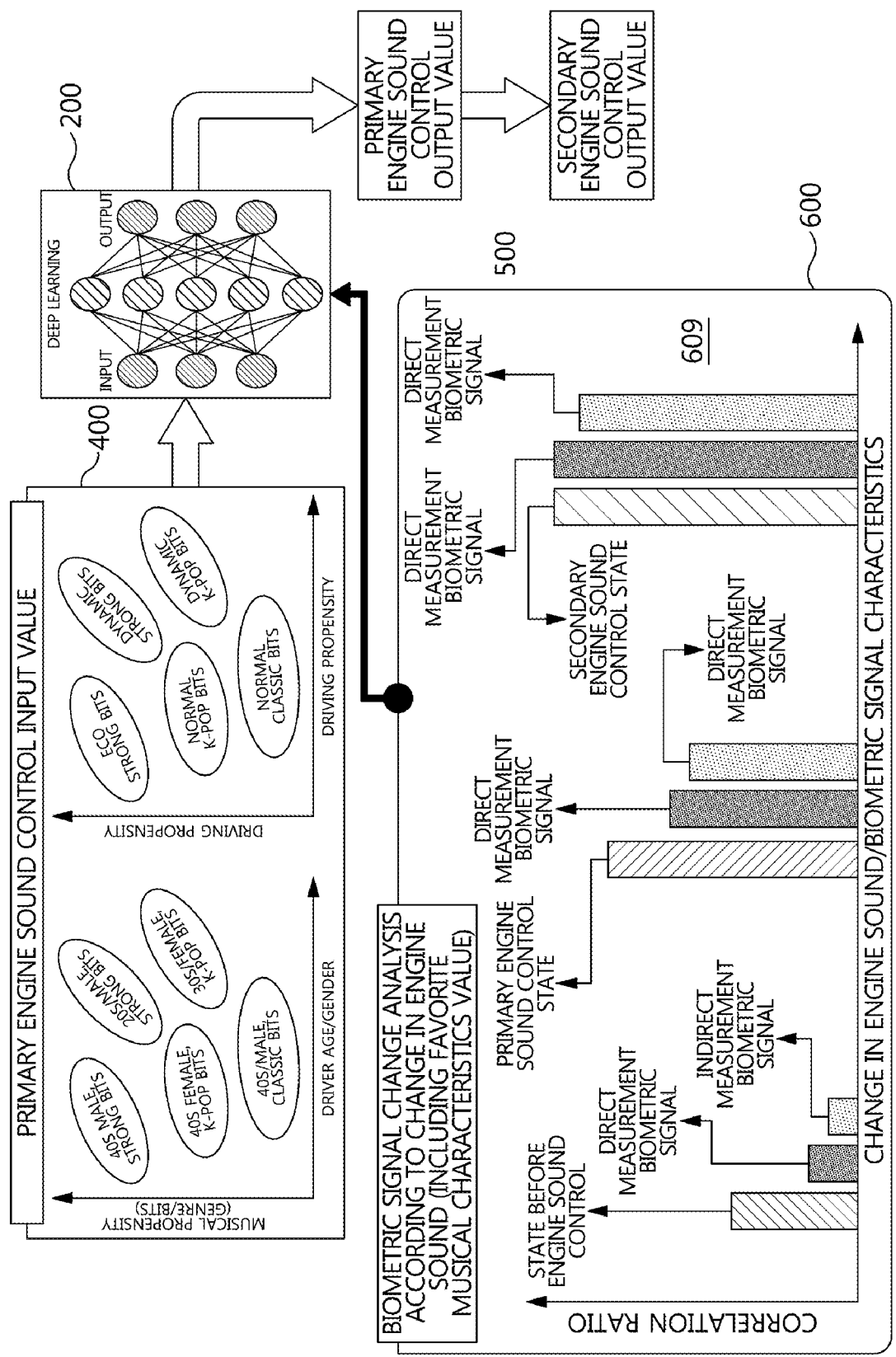
FIG. 5 is a flowchart of the driver biometric information using artificial intelligence according to an exemplary embodiment of the present disclosure.

Then, FIG. 5 is a flowchart of the driver biometric information using artificial intelligence according to an exemplary embodiment of the present disclosure. As shown, the biometric information analyzing map 609 of the driver biometric information recognizing device 600 may apply the heart rate signal, the electrocardiogram signal, the facial pattern change, the body temperature change signal, etc. from the steering wheel biometric sensor 601, the window biometric sensor 603, and the seat biometric sensor 605 as the direct measurement signal, and apply the biometric signal, etc. generated from a smart watch, a band, and a medical monitoring device worn by the driver from the wearable biometric sensor 607 as the indirect measurement signal.

Therefore, the biometric information analyzing map 609 helps to perform a suitability determining technique on the vehicle engine sound control result based on the musical propensity of the driver. For example, the correlation between the change in biometric signal and the engine sound is as follows. Firstly, the characteristic control according to the favorite music Bits of the driver may be followed by the Powerful sound control according to the strong Bits determination in the engine sound control (e.g., relationship 1).

Secondly, the collection/analysis of the measured change in biometric signal data uses the characteristics of the number of the favorite music Bits as the reference of the change in biometric signal with an increase in heart rate/an increase in temperature/facial pattern determination (e.g., excitement and enjoyment) in the Powerful sound control (e.g., relationship 2). Thirdly, performing an additional compensation control of the engine sound control factor according to the change in biometric signal of the driver may be used as the biometric signal correlation matching target (e.g., relationship 3).

Specifically, the suitability determination of the engine sound control result by the biometric information analyzing map 609 may set the change in biometric signal as Big data, and may be used to extract the parameters for comparing the biometric signal characteristics before the engine sound control from the Big data with the biometric signal characteristics after the engine sound control, to analyze the correlation between the characteristics of the low frequency/medium frequency/high frequency Bits for each genre of music and the characteristics of the biometric signal, to compensate for the target engine sound control signal using the relationship between the biometric change characteristics change data of the driver and the engine sound control characteristics, etc.

As a result, the driver biometric information recognizing device 600 may be configured to transmit the suitability determination information regarding the engine sound control result obtained from the biometric information analyzing map 609 to the artificial intelligence learning unit 200, and the artificial intelligence module 201 of the artificial intelligence learning unit 200 may be configured to determine a final engine control sound by compensating for the output value of the parameter used in the Deep Learning-based engine sound control.

Figure 6:
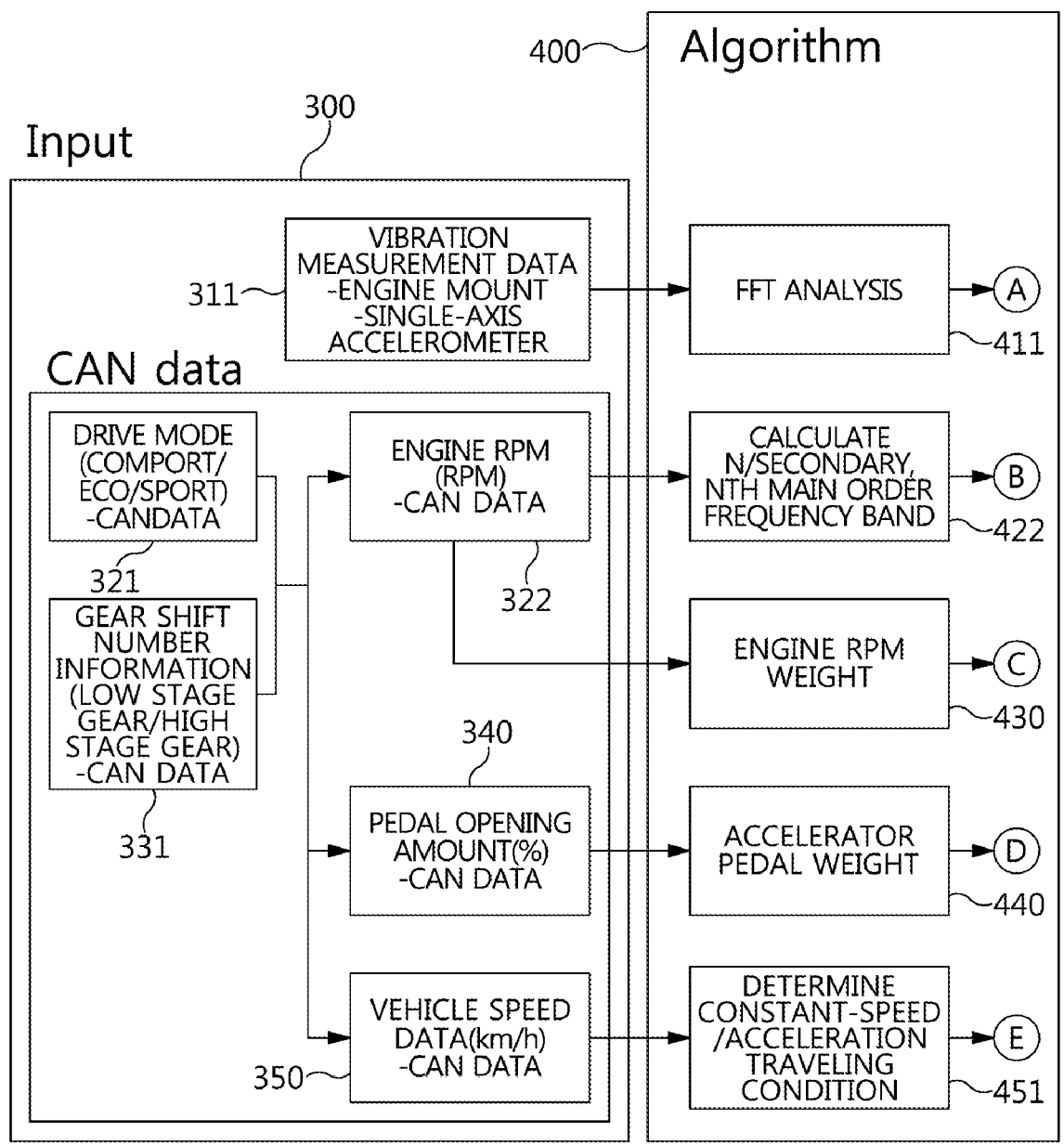
FIGS. 6 and 7 are flowcharts of a vibration-based engine sound control (ESEV) according to an exemplary embodiment of the present disclosure.
Figure 7:
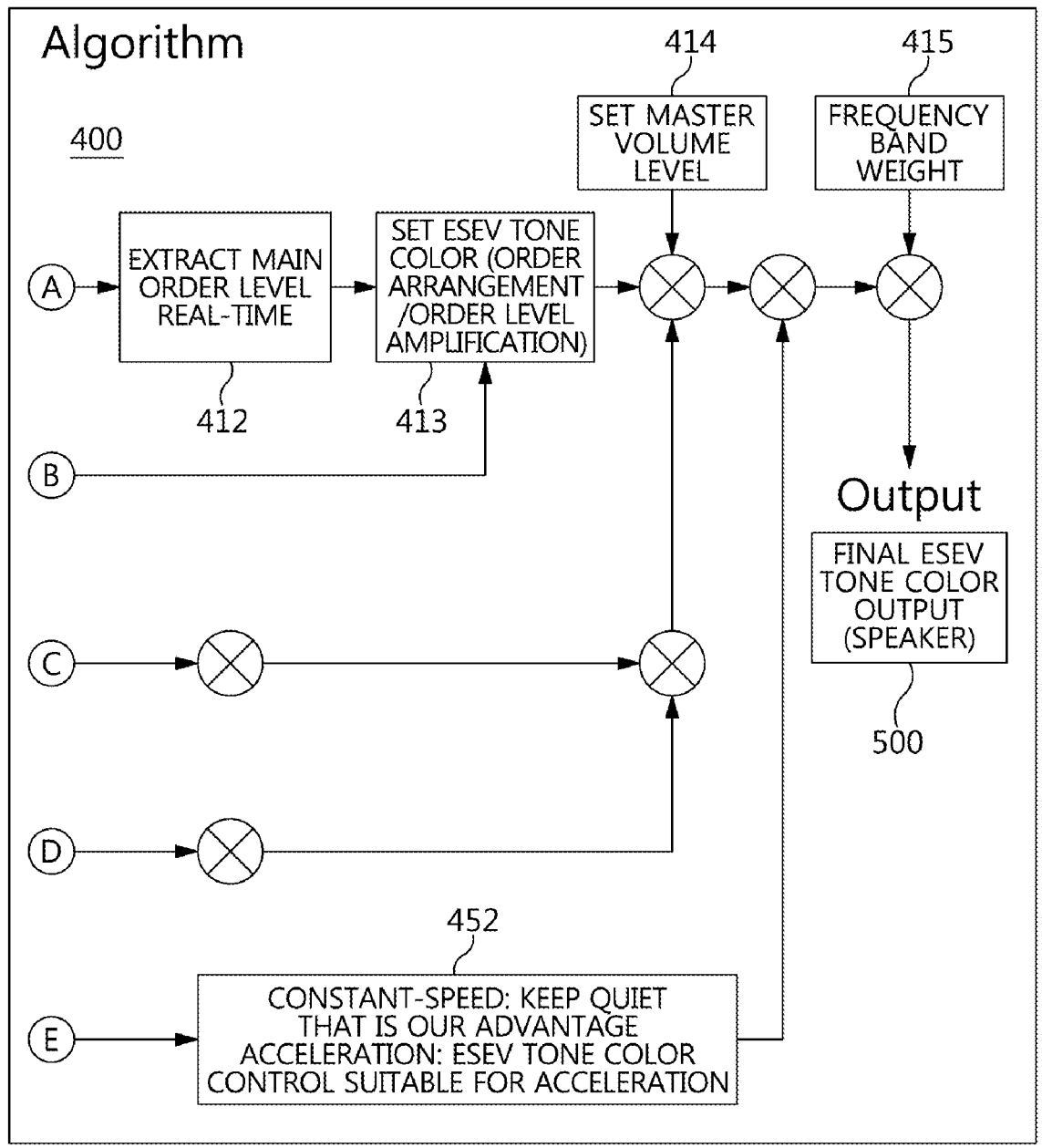

Meanwhile, FIGS. 6 and 7 are flowcharts of vibration-based engine sound control (ESEV) according to an exemplary embodiment of the present disclosure. A vibration measuring unit 311 may include engine mount information and single-axis accelerometer information. A FFT analyzing unit 411 may be configured to receive vibration information such as an engine mount from the vibration measuring unit 311, and frequency band information from an engine main order frequency band calculating unit 422 connected to an engine revolutions per minute (RPM) information 322. A main order level real-time extracting unit 412 may be configured to extract the main order level from the FFT analyzing unit 411 in real time. The vibration-based engine sound control (ESEV) unit 413 may be configured to receive the information from the main order level real-time extracting unit 412 and the engine main order frequency band calculating unit 422 to amplify the engine order arrangement and level for determining the engine tone color to transmit the information to a master volume level setting unit 414.

Meanwhile, an engine RPM weight providing unit 430 may be configured to receive the engine RPM information from the engine RPM information 322 to provide weight information thereto and transmit the information to the master volume level setting unit 414. An acceleration pedal weight providing unit 440 may be configured to transmit a value of providing a weight to pedal opening amount information 340 to the master volume level setting unit 414. The master volume level setting unit 414 may be configured to provide the master volume level information to the frequency band weight providing unit 415. At this time, a traveling condition for each vehicle speed determining unit 451 may be configured to receive the speed information from vehicle speed data 350 to determine whether it is in a constant-speed state or in an acceleration state, and transmit the result to a speed-based tone color controller 452.

Furthermore, the speed-based tone color controller 452 may be provided to the procedure in which the master volume level setting unit 414 provides the master volume level information to the frequency band weight providing unit 415. The frequency band weight providing unit 415 may be configured to apply an output signal to the output unit 500. In the second stage, the favorite frequency band may also be emphasized through a favorite frequency band equalizer control for each driver classification. In other words, the second driving-related information may be related to the adjustment of the equalizer EQ information of the engine sound. The target engine sound may be output through at least any one of an indoor speaker of the vehicle, a resonator, and a frequency filter.

Figure 8:
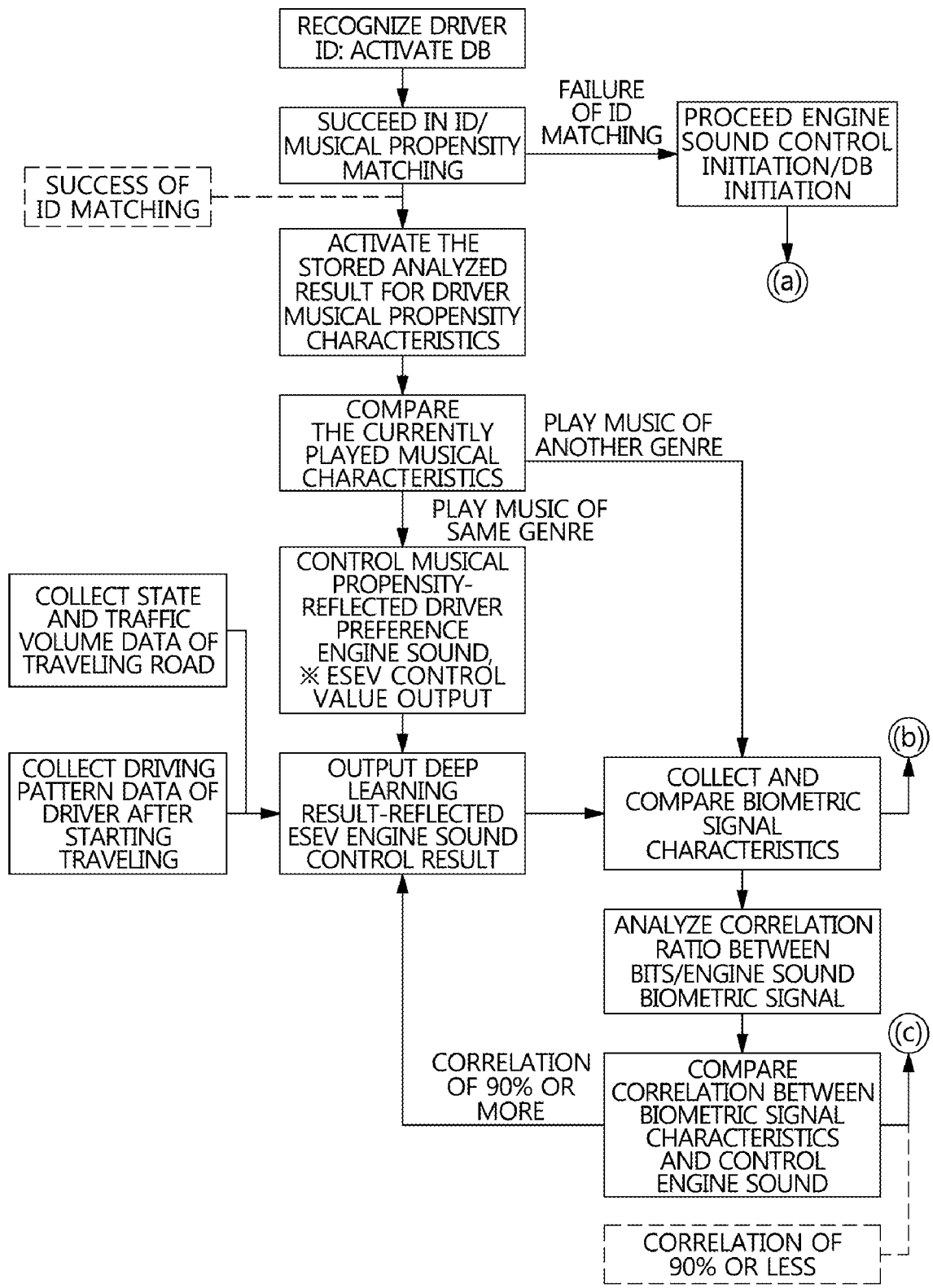
FIGS. 8 and 9 are block diagrams showing a vehicle engine sound control method based on the driver propensity and the driver biometric information using artificial intelligence according to an exemplary embodiment of the present disclosure.
Figure 9:
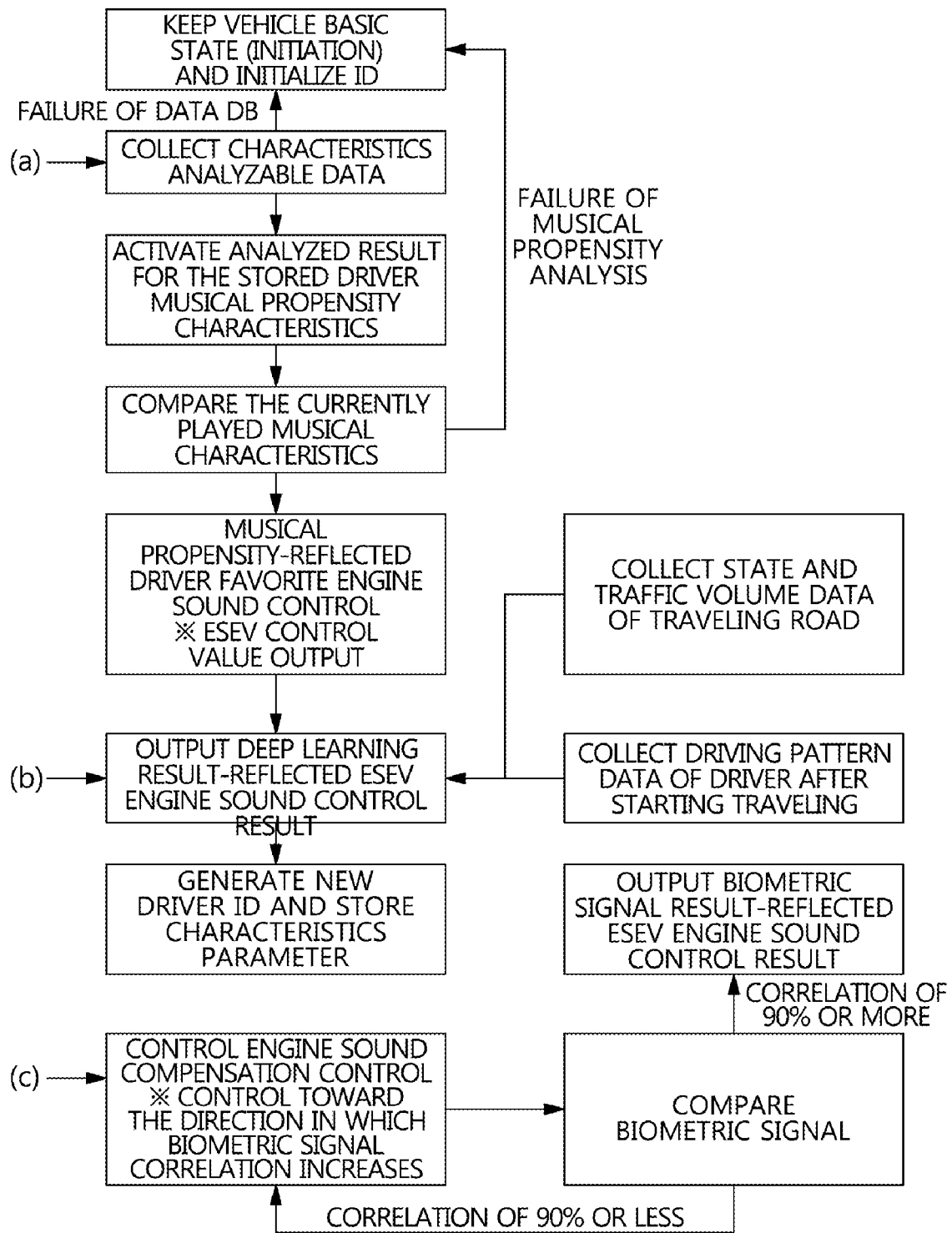

Hereinafter, a vehicle engine sound control method based on the driver propensity using artificial intelligence with respect to the block diagram of the vehicle engine sound control method according to an exemplary embodiment of the present disclosure of FIGS. 6 and 7 will be described with reference to FIGS. 8 and 9 together. In particular, FIGS. 8 and 9 are block diagrams showing a vehicle engine sound control method based on the driver propensity and based on the driver biometric information using artificial intelligence, and the block diagram of the vehicle engine sound control method supplementarily explains the base engine sound control flow as described below.

Firstly, a first stage may include outputting primary engine sound of a vehicle by learning first driving-related information regarding artificial intelligence learning information of a driver in the artificial intelligence of the vehicle. The first driving-related information may be Bluetooth information or biometric recognizing information, etc. interlocked to the driver smartphone. Meanwhile, the vehicle driver may be a person who owns the corresponding vehicle, and may be a person who may identify the ID through the biometric recognizing information since the driver information remains in the vehicle.

On the other hand, if the corresponding driver information is not recorded in the corresponding vehicle at all as a new driver and the new driver does not hold an application capable of interlocking with the vehicle such as a smartphone, the driving musical propensity of the new driver may be confirmed using the music being listened to while the vehicle is being driven. Meanwhile, the first driving-related information may be at least any one of the sound source information stored in the driver smartphone, and the characteristics information of the type of music or the Bits of music to which the driver listens during traveling.

In addition, the first driving-related information may include at least any one of an acceleration pattern, a shift pattern, a brake pattern, and a fastest use pattern. This may be acquired from the controller area network (CAN) communication information of the vehicle, and may be the drive mode 321, the gear stage number information 331, the engine RPM information 322, the pedal opening amount information 340, and the vehicle speed information 350. The drive mode 321 selected by the driver may include the Comfort mode, the Normal mode, the Sport mode, etc. The gear stage number information 331 may include the gear stage number information selected by the driver while operating the vehicle, and the driver's intent may be more actively used in the automatic shift function and also in the manual shift function.

Further, the engine RPM information 322, the pedal opening amount information 340, and the vehicle speed information 350 according to the drive mode 321 and the gear stage number information 331 may be used as the first driving-related information. In other words, the CAN communication of the vehicle may be used to confirm the traveling characteristics of the driver. Meanwhile, the indoor tone color measuring sensor 101 mounted within the vehicle may be configured to analyze the control result of the engine sound and using the engine sound Big data for the additional learning. Meanwhile, the first driving-related information may further include traveling regional information or traveling temporal information of the vehicle.

The traveling regional information of the vehicle indicates information of the region where the vehicle is being driven, such as whether the traveling region is in an urban, a suburban, or a highway. The traveling temporal information indicates information regarding whether the time zone during which the vehicle is being driven is a commute time with a substantial amount of traffic, whether it is a dawn time with minimal vehicle traffic, etc.

The artificial intelligence learning unit 200 may be configured to receive and learn as the input values all of the driving characteristic information such as an acceleration pattern, a shift pattern, a brake pattern, a fastest use pattern, etc. and the music information such as the genre, musician, and Bits information of the music to which the driver listens (e.g., including the sound source data stored upon interlocking with the smartphone), and the spatial-temporal traveling environment condition of the main driving section. Therefore, the preference of the engine sound according to the music preference of the driver may be learned through Deep Learning, and at this time, the guidance learning method based on the Recurrent Neural Network (RNN) and the Deep Neural Network (DNN) may be used.

A second stage may include outputting favorite target engine sound of the driver by additionally learning second driving-related information generated by the artificial intelligence learning information by the driver's response to the output primary engine sound. The target engine sound may be the driver favorite engine sound that reflects the characteristics of the driver. This may be achieved by adjusting the arrangement and level of the engine order through the engine sound category control for each driver classification. In other words, the target engine sound may be based on the vibration-based engine sound control (ESEV). Meanwhile, according to another exemplary embodiment of the present disclosure, it is preferable to be adjusted by at least any one of the virtual sound source control (ASD) or the structure-borne noise control (ESG).

What is claimed is:

1. A vehicle engine sound control system based on driver propensity using artificial intelligence, comprising:
    a driver identifying unit configured to identify a vehicle driver using a driver smartphone or a driver biometric information detecting sensor;
    a music analyzing unit configured to analyze music to which the identified driver listens with the driver smartphone or a vehicle infotainment system;
    a travel analyzing unit configured to analyze a traveling pattern of the driver by applying any one among a vehicle, a global positioning system (GPS), a road, and weather as a condition;
    an artificial intelligence learning unit configured to generate a driver propensity engine sound pattern as a result value by learning at least any one information determined by the driver identifying unit, the music analyzing unit, and the travel analyzing unit;
    an engine sound controller configured to adjust the engine sound of the vehicle based on the result value of the artificial intelligence learning unit; and
    an output unit configured to output the adjusted engine sound,
    wherein the driver biometric information detecting sensor is configured to detect a direct measurement signal information and an indirect measurement signal information,
    wherein the direct measurement signal information includes a steering wheel biometric sensor detecting a change in a hear rate/electrocardiogram/hand temperature of the driver as a signal, a window biometric sensor detecting a change in facial surface/facial temperature of the driver as a signal, and a seat biometric sensor detecting a change in body temperature/brain wave of the driver as a signal, and
    wherein the indirect measurement signal information includes a wearable biometric sensor detecting a biometric signal generated of the driver.

2. The vehicle engine sound control system based on the driver propensity using the artificial intelligence of claim 1,
    wherein the driver identifying unit is configured to connect with a near-field wireless communication, and confirm driver identification (ID) information with the driver smartphone, and
    wherein the wearable biometric sensor is configured to connect with a vehicle infotainment system to detect the driver biometric information.

3. The vehicle engine sound control system based on the driver propensity using the artificial intelligence of claim 1, wherein the music analyzing unit reflects the characteristics of the type of music or bits of music to which the driver listens while operating the vehicle.

4. The vehicle engine sound control system based on the driver propensity using the artificial intelligence of claim 1, wherein the travel analyzing unit further includes at least any one of the traveling regional information or the traveling temporal information of the vehicle, and the artificial intelligence learning unit learns any one or more among the age, gender, and the genre and bits information of favorite music of the driver.

5. The vehicle engine sound control system based on the driver propensity using the artificial intelligence of claim 4, wherein the engine sound controller is configured to:
    output a primary engine sound based on the result learned in the artificial intelligence learning unit, and
    implement a target engine sound desired by the driver by re-learning a feedback result value at which the driver has responded to the output primary engine sound in the artificial intelligence learning unit.

6. The vehicle engine sound control system based on the driver propensity using the artificial intelligence of claim 5, wherein the feedback result value reflects at least any one changed value of the music analyzing unit and the travel analyzing unit.

7. The vehicle engine sound control system based on the driver propensity using the artificial intelligence of claim 5, wherein:
    the engine sound is any one among Powerful sound, Pleasant sound, Dynamic sound, and Sporty sound,
    the Powerful sound is a strong sense of mid/low frequency characteristics,
    the Pleasant sound is a strong sense of pure sound without discomfort characteristics,
    the Dynamic sound is a strong case of speed along with mid/low frequency characteristics, and
    the Sporty sound is a strong sense of speed along with pure sound characteristics.

8. The vehicle engine sound control system based on the driver propensity using the artificial intelligence of claim 1, wherein the artificial intelligence learning unit is a guidance learning method using recurrent neural network (RNN) and deep neural network (DNN) methods.

9. The vehicle engine sound control system based on the driver propensity using the artificial intelligence of claim 1, wherein the engine sound controller is configured to adjust the arrangement and level of an engine order of the vehicle.

10. The vehicle engine sound control system based on the driver propensity using the artificial intelligence of claim 1, wherein the engine sound controller is configured to adjust frequency weight information of the engine sound, and adjust equalizer information of the engine sound.

11. The vehicle engine sound control system based on the driver propensity using the artificial intelligence of claim 1, wherein the output unit is at least any one among the group consisting of: an indoor speaker of the vehicle, a resonator, and a frequency filter.

12. A vehicle engine sound control method based on driver propensity using artificial intelligence comprising the vehicle engine sound control system of claim 1, comprising:
    outputting, by a controller, a primary engine sound of a vehicle by learning first driving-related information regarding artificial intelligence learning information of a driver in the artificial intelligence of the vehicle; and
    outputting, by the controller, a favorite target engine sound of the driver by additionally learning second driving-related information generated by the artificial intelligence learning information by a driver response to the output primary engine sound.

13. The vehicle engine sound control method based on the driver propensity using the artificial intelligence of claim 12, wherein the first driving-related information is driver identification (ID) information confirmed by a driver smartphone in communication with near-field wireless communication or driver biometric recognition information confirmed using a driver biometric information detecting sensor.

14. The vehicle engine sound control method based on the driver propensity using the artificial intelligence of claim 12, wherein the first driving-related information is at least any one of the sound source information stored in the driver smartphone, and the characteristics information of the type of music or bits of music to which the driver listens while operating the vehicle.

15. The vehicle engine sound control method based on the driver propensity using the artificial intelligence of claim 12, wherein the first driving-related information includes at least one of the group consisting of: an acceleration pattern, a shift pattern, a brake pattern, and a fastest use pattern.

16. The vehicle engine sound control method based on the driver propensity using the artificial intelligence of claim 12, wherein the first driving-related information further includes at least any one of the traveling regional information or the traveling temporal information of the vehicle.

17. The vehicle engine sound control method based on the driver propensity using the artificial intelligence of claim 12, wherein the artificial intelligence uses a guidance learning method using recurrent neural network (RNN) and deep neural network (DNN) methods.

18. The vehicle engine sound control method based on the driver propensity using the artificial intelligence of claim 12, wherein the second driving-related information is frequency weight information of the engine sound or equalizer information of the engine sound.

19. The vehicle engine sound control method based on the driver propensity using the artificial intelligence of claim 12, wherein the target engine sound is adjusted by at least one selected from the group consisting of: a vibration-based engine sound control (ESEV), a virtual sound source control (ASD), and structure-borne noise control (ESG).

20. The vehicle engine sound control method based on the driver propensity using the artificial intelligence of claim 12, wherein the target engine sound is output through at least one from the group consisting of: an indoor speaker of the vehicle, a resonator, and a frequency filter.

\* \* \* \* \*